(No Model.)
A. E. POTTER.
HARVESTER TRUCK.
No. 292,851. Patented Feb. 5, 1884.
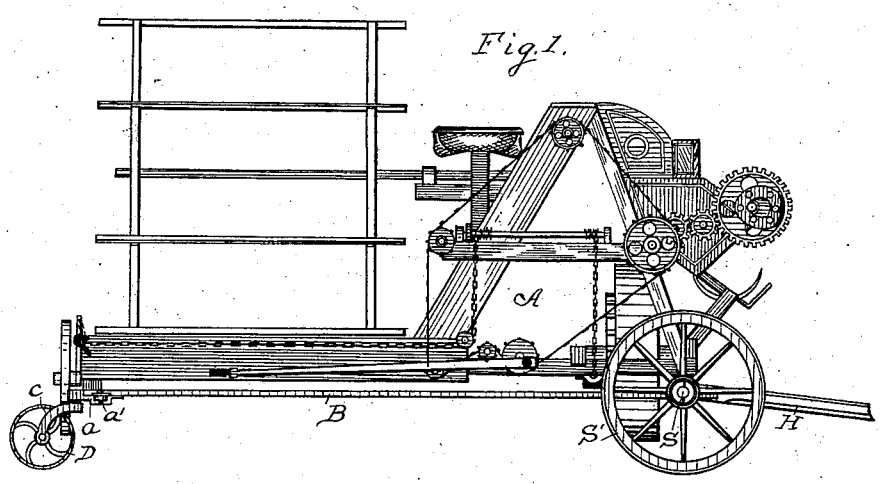
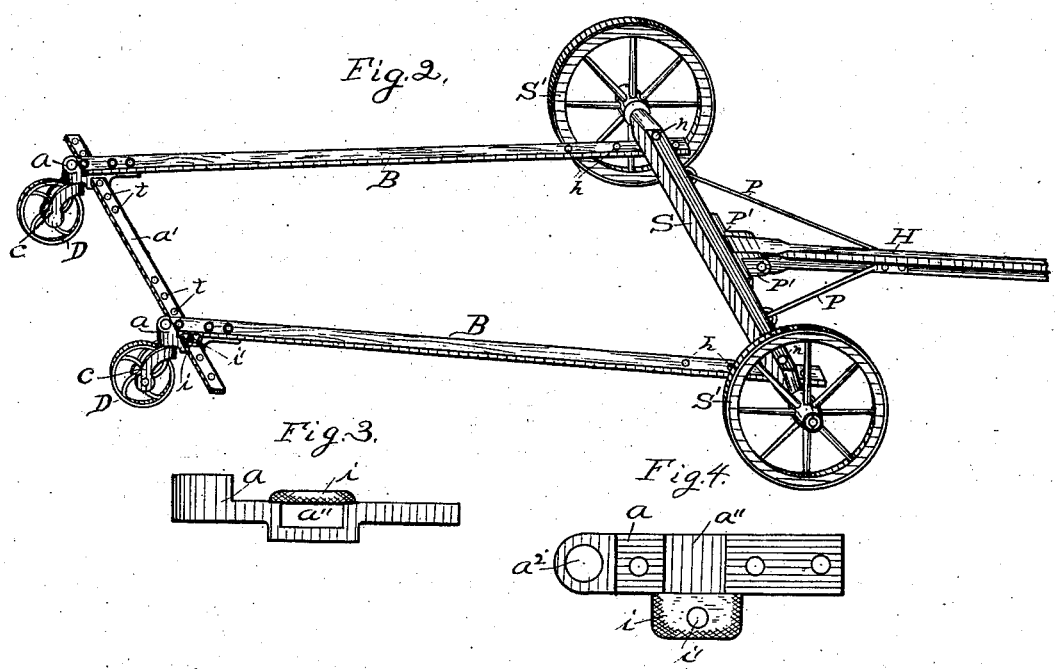
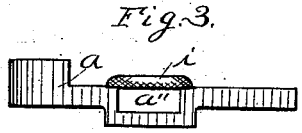
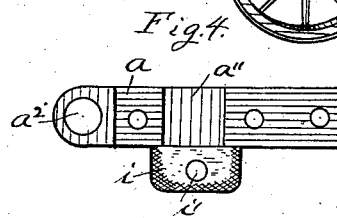
Witnesses,
Thos. H. Hutchins.
Wm. J. Hutchins.
Inventor,
Arthur E. Potter.

UNITED STATES PATENT OFFICE.

ARTHUR E. POTTER, OF JOLIET, ILLINOIS.

HARVESTER-TRUCK.

SPECIFICATION forming part of Letters Patent No. 292,851, dated February 5, 1884.

Application filed September 22, 1883. (No model.)

*To all whom it may concern:*

Be it known that I, ARTHUR E. POTTER, a citizen of the United States of America, residing at Joliet, in the county of Will and State of Illinois, have invented certain new and useful Improvements in Harvester-Trucks, of which the following is a specification, reference being had therein to the accompanying drawings.

Figure 1 is a side elevation; Fig. 2, a perspective view; Fig. 3, a side view of the casting which supports the caster-wheels D, and Fig. 4 a plan view on the top of said casting.

This invention relates to certain improvements in trucks for harvesters, for the purpose of enabling the harvester to be transported endwise, and is of that class that are entirely independent from the harvester and adapted to be placed under the harvester to support it; and the improvements I have made I will fully set forth in the following specification and claims.

Referring to the drawings, Fig. 2 is a perspective view of the truck complete as it appears separate from and detached from the harvester, and Fig. 1 represents the harvester A mounted on the truck, ready to be transported endwise. The particular features in this truck are in its being constructed so as to be adjustable to adapt it to any sized harvester, and so arranged that the caster-wheels D D may be set any distance apart, but generally to travel in the horses' tracks in the road, as it is not safe or desirable to let them travel in the wheel-tracks on account of ruts, which, from their size, they could not travel in.

B B are two reaches attached to the front axle, S, by a bolt, $n\ n$. That end of these reaches is provided with a row of holes, $h\ h$, by means of which the truck may be lengthened or shortened to suit the length of the harvester. The other or rear ends of the reaches B B bolt firmly on or to the castings $a$, which castings are shown particularly in Figs. 3 and 4, and to which the casters attach by means of a vertical pivot, $c$, as shown in Figs. 1 and 2. These castings drop near their center portion, as shown particularly in Fig. 3, to form an eye, $a''$, through which the cross-bar $a'$ passes, and is also provided with a projecting lug, $i$, at one side and integral therewith, which lug is pierced with a hole, $i'$, as shown more particularly in Fig. 4, for the reception of a bolt. The cross-bar $a'$ is provided with a row of holes, $t\ t$, (shown in Fig. 2,) corresponding with the holes in the lugs $i$. A bolt passes through the holes in the lugs and through said cross-bar, by means of which the rear end of the reaches B B may be contracted or spread apart, as may be desired, for the purpose stated.

It will be observed that by such construction the truck is capable of being adjusted both as to length and width to accommodate it to the size of any harvester, and to enable the casters to travel out of the wagon-tracks of the road, and thus avoid ruts, which rack and spoil the harvester.

The axle S is provided with the ordinary traveling wheels, S', and pole H, having the braces P P and hinged at P' to the axle, as shown.

Having thus described my invention, what I claim as new, and desire to secure by Letters Patent, is as follows, to wit:

1. The combination of the reaches B B, having the row of holes $h\ h$, axle S, cross-bar $a'$, having the row of holes $t\ t$, casting $a$, having the eye $a''$ and lug $i$, provided with the hole $i'$, wheels S' S', and casters D D, all adapted to operate as and for the purpose set forth.

2. In an independent harvester-truck, the reaches B B, pivoted to the front axle, S, so their rear ends may have horizontal motion, in combination with the perforated cross-bar $a'$, as and for the purpose set forth.

ARTHUR E. POTTER.

Witnesses:
THOS. H. HUTCHINS,
W. J. HUTCHINS.